United States Patent [19]

Ishiguro et al.

[11] Patent Number: 5,794,456
[45] Date of Patent: Aug. 18, 1998

[54] ABSORPTION-TYPE AIR CONDITIONING APPARATUS HAVING FIN TUBE ABSORPTION LIQUID REGENERATORS

[75] Inventors: Katsusuke Ishiguro; Takehiro Sato, both of Nagoya; Akira Maruyama, Kasugai, all of Japan

[73] Assignee: Paloma Industries, Ltd., Aichi, Japan

[21] Appl. No.: 877,661

[22] Filed: Jun. 18, 1997

[30] Foreign Application Priority Data

Jul. 11, 1996 [JP] Japan .................. 8-203293

[51] Int. Cl.$^6$ .................................. F25B 33/00
[52] U.S. Cl. .................................. 62/497; 62/476
[58] Field of Search .................. 62/497, 476, 101, 62/489, 495; 122/14, 17, 19, 13 R

[56] References Cited

U.S. PATENT DOCUMENTS

| 2,203,074 | 6/1940 | Anderson | 62/497 |
|---|---|---|---|
| 3,137,144 | 6/1964 | Kaufnman | 62/497 |
| 4,085,595 | 4/1978 | Saito et al. | 62/476 |
| 4,294,076 | 10/1981 | Yoshii | 62/235.1 |
| 5,546,760 | 8/1996 | Cook et al. | 62/497 |

FOREIGN PATENT DOCUMENTS 6-21743   3/1994   Japan ............... F25B 30/04

*Primary Examiner*—William Doerrler
*Attorney, Agent, or Firm*—Robin, Blecker & Daley

[57] ABSTRACT

An absorption-type air-conditioning apparatus uses an absorption liquid that is a solution of a liquid coolant and an absorption medium. First and second regenerators are provided for heating the absorption liquid to release coolant vapor and concentrate the absorption liquid. Each of the regenerators includes a respective fin-tube-type heat exchanger in which the absorption liquid flows as it is being heated.

10 Claims, 3 Drawing Sheets

ABSORPTION-TYPE AIR CONDITIONING APPARATUS HAVING FIN TUBE ABSORPTION LIQUID REGENERATORS

FIELD OF THE INVENTION

This invention is concerned with an absorption-type air-conditioning apparatus which is able to perform both cooling and heating operations.

BACKGROUND OF THE INVENTION

In a conventional absorption-type air-conditioning apparatus, an absorption medium is used to reduce the internal pressure in a chamber so that a liquid coolant evaporates. In such an apparatus, a two-stage system is often used, in which heat is released and recycled as a coolant vapor condenses. FIG. 3 shows, in schematic terms, the design of a conventional two-stage absorption-type air-conditioning apparatus which uses water as a coolant and lithium bromide as an absorption medium. This absorption-type air-conditioning apparatus includes a high temperature regenerator 10, a high temperature regenerator phase separator 11 (hereinafter sometimes referred to as a "high temperature separator"), a low temperature regenerator 20, a condenser 30, an evaporation chamber 40, and an absorption chamber 50. The high temperature regenerator 10 and the low temperature regenerator 20 both include a liquid-storage-type boiler. A burner 1 heats a first (low-concentration) lithium bromide aqua solution in a boiler 10a. The high temperature separator 11 separates the low-concentration liquid heated in the high temperature regenerator 10 into steam or coolant vapor and a second absorption liquid, which has a lower concentration of water and a higher concentration of absorption medium than the first absorption liquid, and which will sometimes be referred to as a "medium-concentration" absorption liquid.

In the low temperature separator 20, the steam or coolant vapor flows through a tube 20b and re-heats the medium-concentration absorption liquid within the boiler 20a. The low temperature regenerator 20 separates the re-heated medium-concentration liquid into steam or coolant vapor and a third absorption liquid which has a lower concentration of water and a higher concentration of absorption medium than the second absorption liquid. The third absorption liquid will sometimes be referred as the "high-concentration absorption liquid."

The condenser 30 cools and liquefies the steam or coolant vapor produced at the low temperature regenerator 20. The water or liquid coolant from the condenser 30 evaporates in an evaporation chamber 40. The water vapor or coolant vapor produced in the evaporation chamber 40 is absorbed into high-concentration absorption liquid in an absorption chamber 50.

A circulation pump 52, a low temperature heat exchanger 53 and a high temperature heat exchanger 54 are positioned along a liquid circulation passage 51 between the absorption chamber 50 and the high temperature regenerator 10. The circulation pump 52 circulates low-concentration absorption liquid formed in the absorption chamber 50 toward the high temperature regenerator 10. The high-concentration absorption liquid formed in the low temperature regenerator 20 transfers heat to the low-concentration absorption liquid in the low temperature heat exchanger 53. The medium-concentration absorption liquid formed in the high temperature separator 11 transfers heat to the low-concentration liquid at the high temperature heat exchanger 54. A pressure reduction valve 13 is positioned in a liquid circulation passage 12 between the high temperature heat exchanger 54 and the low temperature regenerator 20.

Steam or coolant vapor selectively flows from the high temperature separator 11 to the evaporation chamber 40 through a bypass line 14, depending on the state of a three-way valve 15 provided at an upstream side of the bypass line 14. The bypass three-way valve 15 is switched from one state to another when the air-conditioning apparatus is switched between a cooling operation mode and a heating operation mode.

Water pipes 41 are provided at the evaporation chamber 40. Water used as a temperature control medium for a room unit (not shown) flows through the water pipes 41. The room unit performs cooling and heating operations according to whether water circulating in the pipes 41 cools or warms air which is circulated through the room unit.

A fan 60 cools the condenser 30 and the absorption chamber 50. Fins 30a on the condenser 30 and fins 50a on the absorption chamber 50 improve the efficiency of the air cooling function provided by the fan 60.

Operation of the conventional absorption-type air-conditioning apparatus of FIG. 3 is as follows:

During a cooling operation, the bypass three-way valve 15 is in a state which causes the steam or coolant vapor generated at the high temperature separator 11 to flow to the low temperature regenerator 20 as indicated by arrow a. At the same time, the fan 60 operates to cause aircooling of the condenser 30 and the absorption chamber 50. The burner 1 heats a low-concentration liquid in the high temperature regenerator 10 (boiler 10a), and steam or coolant vapor is formed. The low-concentration liquid is separated into steam or coolant vapor and a medium-concentration absorption liquid in the high temperature separator 11. The medium-concentration liquid transfers its heat to a low-concentration liquid as it passes through the high temperature heat exchanger 54, and then the medium-concentration liquid flows into the low temperature regenerator 20. The medium-concentration liquid is re-heated at the low temperature regenerator 20 by steam produced at the high temperature separator 11, and the medium-concentration liquid therefore separates into steam or coolant vapor and a high-concentration absorption liquid. The high-concentration liquid transfers its heat to the low-concentration absorption liquid as the high-concentration liquid passes through the low temperature heat exchanger 53, and the high-concentration liquid is then dripped into the absorption chamber 50.

On the other hand, the steam or coolant vapor is cooled and liquified in the condenser 30, and the resulting water or liquid coolant flows into the evaporation chamber 40. The water or liquid coolant entering the evaporation chamber 40 evaporates because the air or vapor pressure in the evaporation chamber 40 is low. The evaporation of the water or liquid coolant in the evaporation chamber removes heat from the water flowing through the water pipes 41. The temperature of the water flowing through the water pipes 41 drops as a result. The water vapor or coolant vapor from the evaporation chamber 40 flows into the absorption chamber 50, where the water vapor or coolant vapor is absorbed into a high-concentration absorption liquid. Heat released when the water vapor or coolant vapor is absorbed into the high-concentration liquid is conducted from the absorption chamber 50 by the fins 50a and passes into the air which is circulated by the fan 60.

After absorbing water vapor or coolant vapor, the high-concentration liquid becomes a low-concentration liquid.

The resulting low-concentration liquid is circulated by the circulation pump 52 through the low temperature heat exchanger 53 and the high temperature heat exchanger 54 to flow into the high temperature regenerator 10. The low-concentration liquid receives heat in both the low temperature heat exchanger 53 and the high temperature heat exchanger 54, and then is further heated in the high temperature regenerator 10.

Operation of the apparatus of FIG. 3 when in a heating mode is as follows:

The bypass three-way valve 15 is set so that steam flows directly to the evaporation chamber 40 via the bypass line 14. In addition, the fan 60 is turned off during the heating mode of the apparatus. The steam or coolant vapor condenses in the chamber 40 and the heat released through condensation and/or latent heat in the steam or coolant vapor is transferred to warm the water flowing through the water pipes 41. The warmed water then flows from the water pipes 41 to the room unit. After the steam or coolant vapor is cooled and liquified in the chamber 40, the water or liquid coolant flows into the absorption chamber 50 to be mixed with a high-concentration absorption liquid.

Conventional air-conditioning apparatus of the type described above are generally rather heavy and also contain a rather large volume of absorption medium. The weight of the conventional apparatus makes it difficult to transport and install the apparatus, and the large volume of absorption liquid causes the apparatus to warm up slowly after being switched on, so that the actual operation of the apparatus is delayed for a considerable period of time after switching on the apparatus.

OBJECTS AND SUMMARY OF THE INVENTION

It is an object of the invention to provide a light weight absorption-type air-conditioning apparatus which can be turned on and then becomes ready for use after a relatively short warm-up period.

According to an aspect of the invention, there is provided an absorption-type air-conditioning apparatus for performing both cooling and heating operations, including a first regenerator for heating a first absorption liquid which is a solution of a liquid coolant and an absorption medium, the first regenerator including a first fin-tube-type heat exchanger having a first fin tube, in which the first absorption liquid is heated while flowing through the first fin tube, the first regenerator separating the first absorption liquid into a coolant vapor and a second absorption liquid which has a lower concentration of liquid coolant and a higher concentration of absorption medium than the first absorption liquid; and a second regenerator, operating at a lower temperature than the first regenerator, for heating the second absorption liquid by using the coolant vapor produced in the first regenerator, the second regenerator including a second fin-tube-type heat exchanger having a second fin tube in which the second absorption liquid is heated while flowing through the second fin tube, the second regenerator separating the second absorption liquid into a coolant vapor and a third absorption liquid which has a lower concentration of liquid coolant and a higher concentration of absorption medium than the second absorption liquid.

By reconcentrating the absorption liquid in first and second regenerators each including a respective fin tube heat exchanger structure, the overall weight of the air-conditioning apparatus is reduced. In addition, the fin tube heat exchangers in the first and second regenerators provided in accordance with the invention require a smaller volume of absorption liquid as compared to the boiler structures of the prior apparatus so that a smaller total volume of absorption liquid is provided in the air-conditioning apparatus according to the invention, and the apparatus can therefore be warmed up in a shorter time than the conventional apparatus.

DESCRIPTION OF PREFERRED EMBODIMENTS

Figure 1:
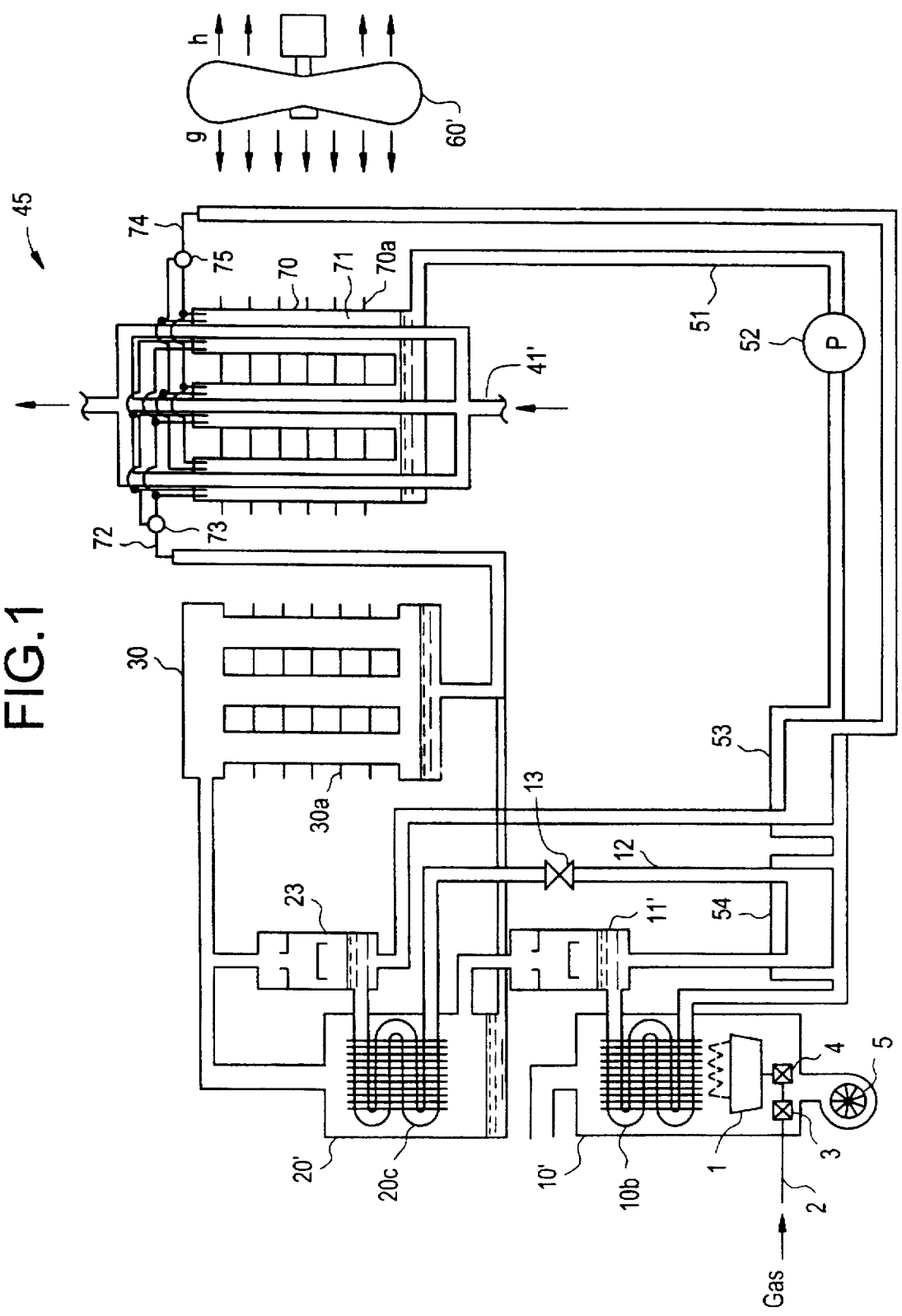
FIG. 1 is a schematic representation of an absorption-type air-conditioning apparatus provided in accordance with the invention.
Figure 3:
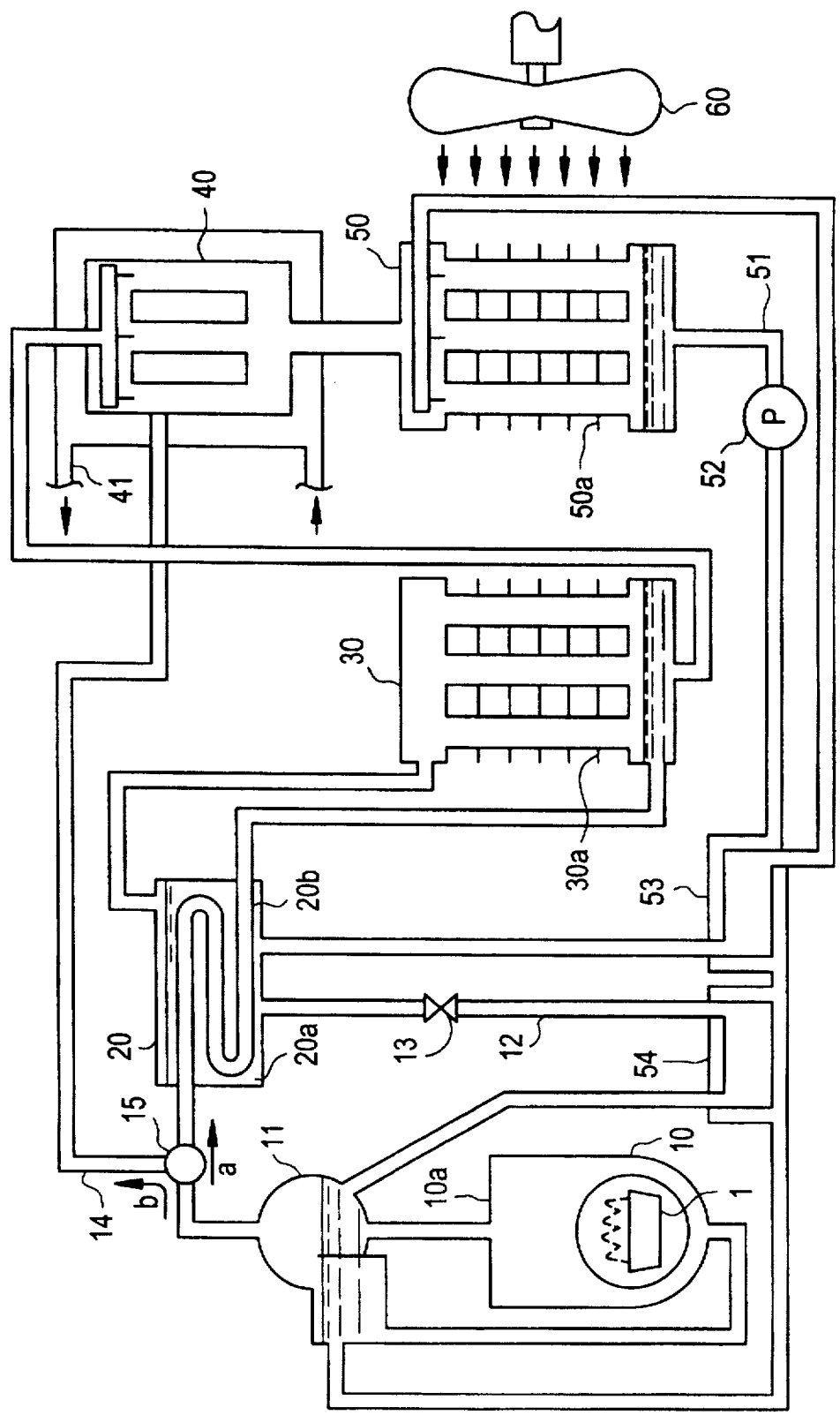
FIG. 3 is a schematic representation of a conventional air-conditioning apparatus.

An embodiment of the invention will now be described with reference to FIG. 1. The general configuration of the apparatus shown in FIG. 1 is similar to that of the conventional air-conditioning apparatus of FIG. 3. However, major differences include the following:

The apparatus of FIG. 1 includes a high temperature regenerator 10' (first regenerator) and a low temperature regenerator 20' (second regenerator), each of which uses a fin-tube-type heat exchanger rather than the liquid-storage type boilers employed by the conventional apparatus of FIG. 3. Moreover, the evaporation chamber 40 and absorption chamber 50 of the conventional apparatus are replaced in the apparatus of FIG. 1 with a combined unit indicated generally by reference numeral 45. Moreover, the bypass line 14 and bypass three-way valve 15 of the conventional apparatus, which allow coolant vapor to reach the evaporation chamber directly, are not included in the apparatus of FIG. 1. Other components of the apparatus of FIG. 1, which are the same as those of the conventional apparatus of FIG. 3, are indicated with the same reference numerals as in FIG. 3, and explanations of those components will be omitted.

Referring, then, to FIG. 1, the high temperature regenerator 10' includes a burner 1, a fin-tube-type heat exchanger 10b, a gas supply line 2, an electromagnetic gas valve 3, a gas flow regulator 4, and a burner fan 5. The burner 1 uses gas as a fuel and heats a low-concentration absorption liquid (preferably lithium bromide aqua solution) which flows through the fin tube of the heat exchanger 10b. The gas supply line 2 supplies gas to the burner 1. The electromagnetic gas valve 3 selectively opens and closes the gas supply line 2. The gas flow regulator 4 controls the volume of gas flowing through the gas supply line 2. The burner fan 5 supplies air required for operation of the burner 1.

The fin tube 10b is constructed by weaving a pipe through a plurality of equally spaced fins. The outlet of the fin-tube-type heat exchanger 10b is connected to a high temperature separator 11', which separates the heated low-concentration liquid into steam or coolant vapor and a medium-concentration absorption liquid, which has a lower concentration of water and a higher concentration of absorption medium (lithium bromide) than the low concentration liquid.

The medium-concentration absorption liquid produced at the separator 11' is cooled in a high temperature heat exchanger 54, and then flows to a fin-tube-type heat exchanger 20c that is part of the low temperature regenerator 20'. The steam or coolant vapor produced at the high temperature separator 11' flows to the low temperature regenerator 20', where the steam or coolant vapor flows over outer surfaces of the fin tube 20c to re-heat the medium-concentration liquid flowing through the fin tube 20c. The outlet of the fin-tube-type heat exchanger 20c is connected to a low temperature regenerator phase separator 23 (sometimes referred to as a "low temperature separator") which separates the re-heated medium-concentration absorption liquid into steam or coolant vapor and a high-concentration absorption liquid that has a lower concentration of water and a higher concentration of absorption medium than the medium-concentration liquid. (The low-, medium-, and high-concentration absorption liquids will sometimes be referred to, respectively, as first, second and third absorption liquids.)

Figure 2:
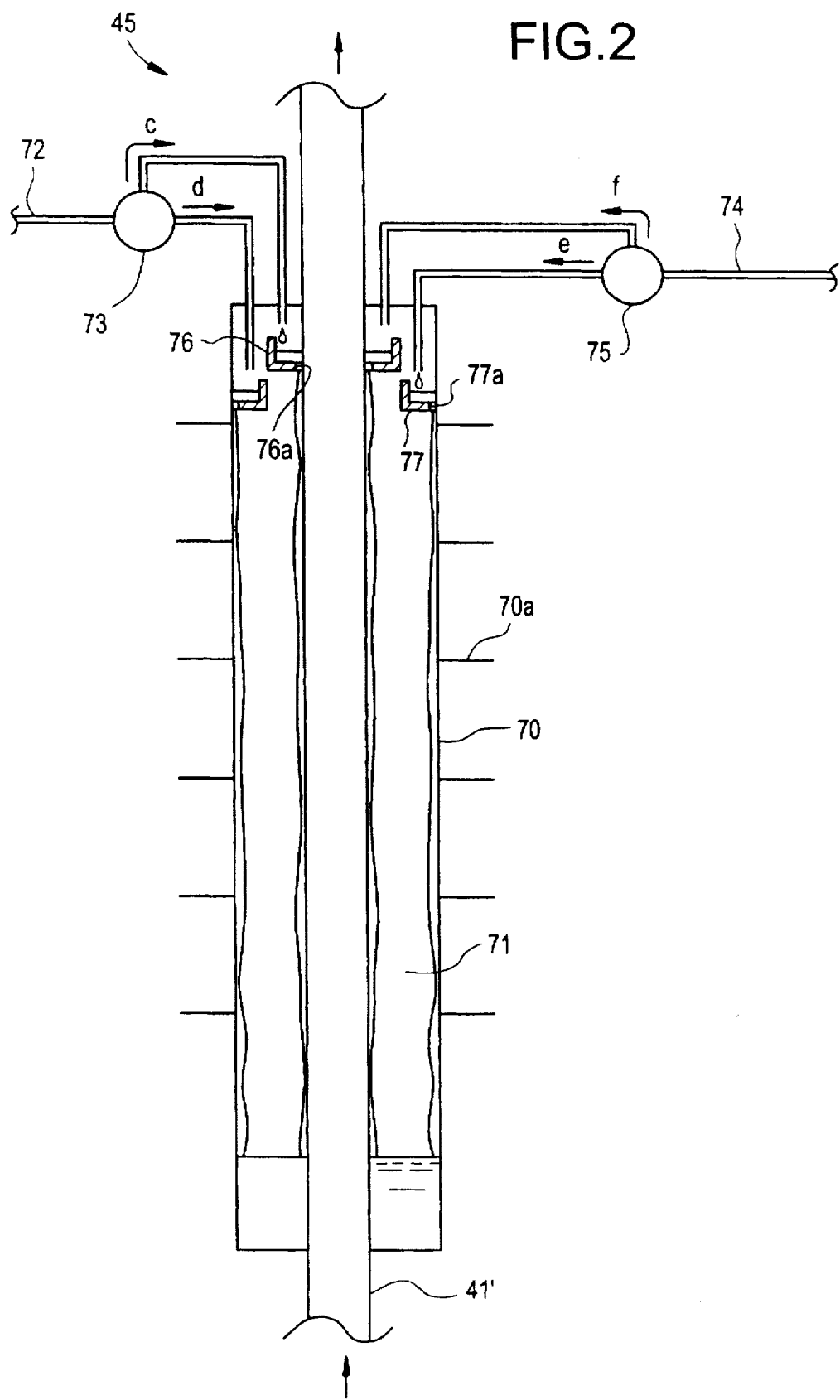
FIG. 2 schematically illustrates certain details of a combined evaporation-absorption unit that is part of the apparatus of FIG. 1.

As indicated in FIG. 2, the combined evaporation-absorption chamber 45 is formed as a concentric double tube structure including an inner water pipe 41' and an outer pipe 70. Evaporation and absorption occur in the space 71 formed between the outer surface of the water pipe 41' and the inner surface of the outer pipe 70. Fins 70a are provided on the outer surface of the outer pipe 70. Air blown by a fan 60' flows over the fins 70a to cool the outer pipe 70.

A first three-way valve 73 is provided on a water or liquid coolant line 72 which connects the condenser 30 to the evaporation-absorption space 71 provided between the water pipe 41' and the outer pipe 70. When the first three-way valve 73 is switched so as to permit liquid flow as indicated by arrow c, water or liquid coolant drips down into a circular reception tray 76 provided on the outer surface of the water pipe 41' in the evaporation-absorption space 71. The water or liquid coolant flows along the outer surface of the water pipe 41' from holes 76a provided at the bottom of the reception tray 76.

When the first three-way valve 73 is switched to permit liquid flow as indicated by arrow d, the water or liquid coolant drips down into a circular reception tray 77 provided on the inner surface of the outer pipe 70, and the water or coolant flows along the inner surface of the outer pipe 70 from holes 77a provided on the bottom of the reception tray 77.

Moreover, a second three-way valve 75 is provided in a line 74 by which high-concentration absorption liquid is provided from the low-temperature regenerator 20' via the low temperature heat exchanger 53. When the three-way valve 75 is switched to permit fluid flow as indicated by arrow e, the high-concentration absorption liquid drips down onto the inner surface of the outer pipe 70 in the evaporation absorption space 71. When the second three-way valve 75 is switched to permit fluid flow as indicated by arrow f, the high-concentration absorption liquid drips down the outer surface of the water pipe 41'.

Operation of the apparatus of FIG. 1 in a cooling mode will now be described.

When the power switch (not shown) is turned on, the circulation pump 52 begins to operate. The burner fan 5 for the high temperature regenerator begins to rotate to pre-purge the regenerator. Then the electromagnetic gas valve 3 opens and the gas flow regulator 4 permits a certain volume of gas to flow to the burner 1. A gas ignition device (not shown) generates sparks repeatedly until the burner 1 ignites. After burner ignition is accomplished, a flame sensor (not shown) confirms that burner ignition has occurred. Once ignition is confirmed, a temperature sensor (not shown) measures the temperature of the water at the outlet of the water pipes 41'.

The flame produced by the burner 1 is controlled by adjusting the flow of gas through the gas flow regulator 4. The gas flow regulator 4 is controlled in accordance with the measured temperature of the water outlet from the pipes 41' and a target water temperature which is defined by a room temperature setting on the room unit (not shown). The speed at which the fan 5 rotates is controlled according variations in the flow of gas through the gas flow regulator 4, so that the ratio between the air flow and the gas flow remains constant. The first three-way valve 73 is switched to permit fluid flow as indicated by arrow c and the second three-way valve 75 is switched to permit fluid flow as indicated by the arrow e. The fan 60' blows air in the direction indicated by the arrow g so that air flows from the evaporation-absorption unit 45 to the condenser 30. The air flow provided by the fan 60' cools the evaporation-absorption unit 45 and the condenser 30.

Steam or coolant vapor is generated when the low concentration liquid which flows through the fin-tube-type heat exchanger 10b of the high temperature regenerator 10' is heated by the flame provided by the burner 1. The high temperature separator 11' separates the low-concentration liquid into steam or coolant vapor and the medium-concentration absorption liquid. The medium-concentration liquid is cooled as it flows through the high temperature heat exchanger 54. Then the cooled medium-concentration liquid reaches the low temperature regenerator 20'. As the medium-concentration liquid flows through the fin-tube-type heat exchanger 20c of the low temperature regenerator 20', the medium-concentration liquid is re-heated by the steam or coolant vapor produced at the high temperature separator 11'. The low temperature separator 23 separates the re-heated medium-concentration liquid into steam or coolant vapor and a high-concentration absorption liquid. The high-concentration liquid is cooled as it flows through the low temperature heat exchanger 53. The cooled high-concentration liquid is dripped onto the inner surface of the outer pipes 70. The steam or coolant vapor is cooled and condensed in the condenser 30 to become water or liquid coolant. The water or liquid coolant is dripped onto the outer surface of the water pipes 41' in the evaporation-absorption spaces 71. The dripped water or liquid coolant evaporates because the pressure in the evaporation-absorption spaces 71 is low. Evaporation of the water or coolant removes heat from the water circulating in the water pipes 41' and cools the water in the pipes 41'. The room unit (not shown) performs a cooling operation by using the cooled water circulating in the water pipes 41'. The evaporated water or liquid coolant in the evaporation-absorption spaces 71 is immediately absorbed by the high-concentration absorption liquid flowing down the inner surface of the outer pipes 70. The absorption of the water or coolant vapor by the high-concentration liquid releases heat, which is removed by the air flow generated by the fan 60'. After absorbing the water or coolant vapor, the high-concentration liquid is diluted to become a low-concentration liquid. The circulation pump circulates the low-concentration liquid from the evaporation-absorption unit 45 to the low temperature heat exchanger 53, then to the high temperature heat exchanger 54, and finally back to the high temperature regenerator 10'. The low-concentration liquid is heated successively as it passes through the low temperature heat exchanger 53, the high temperature heat exchanger 54 and the high temperature regenerator 10'.

Operation of the apparatus of FIG. 1 in a heating mode will now be described:

For a heating operation, the first and second three-way valves 73 and 75 are switched so as to permit fluid flow as indicated by the arrows d and f, respectively. The fan 60' operates to provide air flow in the direction indicated by the arrows h, i.e. in the opposite direction provided during cooling operations. Consequently, air flows from the condenser 30 to the evaporation-absorption unit 45. Water or liquid coolant from the condenser 30 is dripped onto the inner surface of the outer pipe 70 in the evaporation-absorption spaces 71 of the unit 45, and the water or liquid coolant evaporates because the pressure in the evaporation-absorption chambers is low. The evaporation of the water or liquid coolant removes heat from the outer pipes 70, thereby cooling the pipes. The outer pipes 70 are prevented from overcooling because the heat generated from the condenser 30 is transferred to the outer pipes 70 by the air flow generated by the fan 60'. The water or coolant vapor is immediately absorbed by the high-concentration absorption liquid flowing on the outer surfaces of the water pipes 41'. The absorption of the water or coolant vapor by the high-concentration liquid generates heat which warms up the water circulating in the water pipes 41'. The room unit performs a heating operation using the warm water circulating in the water pipes 41'.

Advantages of the air-conditioning apparatus provided in accordance with the invention, some of which have been mentioned above, will be discussed below.

Because the air-conditioning apparatus of the present invention uses fin-tube-type heat exchangers in the high and low temperature regenerators instead of the conventional boiler-type structure, the apparatus provided according to the invention requires a smaller amount of the liquid coolant-absorption medium solution than the conventional apparatus. Therefore, the absorption medium solution can be warmed up faster than in the conventional apparatus, and the apparatus of the present invention commences operation more quickly. Moreover, the overall weight of the apparatus is reduced.

Further, the fin-tube-type heat exchangers employed in the regenerators 10' and 20' permit more efficient heating of the absorption liquid than occurs in the conventional apparatus. In addition, both the high and low temperature separators 11' and 23 may be formed so as to have identical structures so that the cost of producing the apparatus can be reduced. Also, the respective fin-tube-type heat exchangers 10b and 20c may have identical structures, permitting a reduction in the cost of those components as well.

The coolant evaporation and absorption functions are combined into a single unit, formed of the double pipes made up of the water pipes 41' and the outer pipes 70, which simplifies the overall structure of the apparatus, allowing the cost of production to be reduced and the apparatus to be relatively small and light in weight. Also, the coolant vapor is absorbed efficiently by the high-concentration absorption liquid because evaporation and absorption occur via surfaces that face each other in the evaporation-absorption spaces 71.

Still further, the water pipes 41' are heated or cooled at the surface of the pipes with favorable efficiency, and the air flow generated by the fan 60' transfers heat generated at the condenser 30 to the outer pipes 70 to prevent the outer pipes 70 from overcooling.

Also, the fins 70a provided on the outer pipes 70 permit the outer pipes 70 to be air-cooled with a structure that is simple as compared to the water-cooling plumbing required if water-cooling of the outer pipes were needed. Consequently, installation and maintenance of the apparatus of the invention is simpler as compared to the conventional apparatus.

Although the preferred embodiment described above combines the evaporation and absorption chambers into a single unit, it is also contemplated to provide an apparatus according to the invention with separate evaporation and absorption chambers.

Also, although the preferred embodiment disclosed above controls the temperature of the air provided by the room unit through controlling the gas flow regulator 4 to adjust the flame in the high temperature regenerator 10', it is contemplated to employ other techniques to control the room temperature. For example, the temperature can be controlled by adjusting the rate of circulation of the absorption liquid provided by the circulation pump 52, or by adjusting the rate of flow of water through the water pipes 41'. Moreover, temperature control can be achieved by intermittently operating the burner 1. In this case, the burner 1 is turned on when the room temperature is below the target temperature setting, and is turned off when the room temperature is at or above the target temperature setting.

Various changes to the foregoing embodiments and practices may be introduced without departing from the invention. The particularly preferred embodiments and practices are thus intended in an illustrative and not limiting sense. The true spirit and scope of the invention is set forth in the following claims.

What is claimed is:

1. An absorption-type air conditioning apparatus, the apparatus comprising:

a first regenerator for heating a first absorption liquid which is a solution of a liquid coolant and an absorption medium, said first regenerator including a first fin-tube-type heat exchanger having a first fin tube in which the first absorption liquid is heated while flowing through the first fin tube, said first regenerator separating said first absorption liquid into a coolant vapor and a second absorption liquid which has a lower concentration of liquid coolant and a higher concentration of absorption medium than said first absorption liquid; and a second regenerator, operating at a lower temperature than said first regenerator, for heating said second absorption liquid by using said coolant vapor produced in said first regenerator, said second regenerator including a second fin-tube-type heat exchanger having a second fin tube in which the second absorption liquid is heated while flowing through the second fin tube, said second regenerator separating said second absorption liquid into a coolant vapor and a third absorption liquid which has a lower concentration of liquid coolant and a higher concentration of absorption medium than said second absorption liquid.

2. An apparatus according to claim 1, wherein said first regenerator includes a gas burner for heating said first absorption liquid flowing through said first fin tube.

3. An apparatus according to claim 2, wherein said coolant vapor produced by said first regenerator flows over outer surfaces of said second fin tube to heat said second absorption liquid flowing through said second fin tube.

4. An apparatus according to claim 1, wherein said liquid coolant is water and said absorption medium is lithium bromide.

5. An apparatus according to claim 1 wherein said first fin tube has a structure that is substantially identical to a structure of said second fin tube.

6. An apparatus according to claim 1, further comprising:

a first separator associated with said first regenerator for receiving heated first absorption liquid from said first fin tube and for outputting coolant vapor and said second absorption liquid from respective outlets; and a second separator associated with said second regenerator for receiving heated second absorption liquid from said second fin tube and for outputting coolant vapor and said third absorption liquid from respective outlets;

said first separator having a structure that is substantially identical to a structure of said second separator.

7. A method of operating an air conditioner, comprising the steps of:

providing a first absorption liquid which is a solution of a liquid coolant and an absorption medium;

first heating said first absorption liquid as said first absorption liquid flows through a first fin tube, to separate said first absorption liquid into a coolant vapor and a second absorption liquid which has a lower concentration of liquid coolant and a higher concentration of absorption medium than said first absorption liquid; and second heating said second absorption liquid as said second absorption liquid flows through a second fin tube, to separate said second absorption liquid into a coolant vapor and a third absorption liquid which has a lower concentration of liquid coolant and a higher concentration of absorption medium than said second absorption liquid, said second heating step making use of said coolant vapor produced from said first absorption liquid.

8. A method according to claim 7, wherein said first heating step includes burning gas to heat said first fin tube.

9. A method according to claim 8, wherein said second heating step includes allowing said coolant vapor produced from said first absorption liquid to flow over outer surfaces of said second fin tube.

10. A method according to claim 7, wherein said liquid coolant is water and said absorption medium is lithium bromide.

* * * * *